United States Patent [19]

Weber

[11] Patent Number: 4,806,838

[45] Date of Patent: Feb. 21, 1989

[54] A.C. INDUCTION MOTOR ENERGY CONSERVING POWER CONTROL METHOD AND APPARATUS

[76] Inventor: Harold J. Weber, 313 Washington St., P.O. Box 6161, Holliston, Mass. 01746

[21] Appl. No.: 197,566

[22] Filed: May 23, 1988

[51] Int. Cl.$^4$ .............................................. H02P 5/40
[52] U.S. Cl. ...................................... 318/729; 318/775
[58] Field of Search ............... 318/775, 776, 777, 729, 318/809, 340, 331, 438

[56] References Cited

U.S. PATENT DOCUMENTS

| | | | |
|---|---|---|---|
| 3,819,996 | 6/1974 | Hablsohn | 318/351 |
| 4,052,648 | 10/1977 | Nola | 318/810 |
| 4,263,540 | 4/1981 | Brandt et al. | 318/775 |
| 4,266,177 | 5/1981 | Nola | 318/810 |
| 4,453,118 | 6/1984 | Phillips et al. | 318/779 |
| 4,533,857 | 8/1985 | Chang et al. | 318/345 A |

OTHER PUBLICATIONS

"Scientific American" magazine, 'Energy–efficient Buildings' (Rosenfeld and Hafemeister), Apr. 1988, pp. 56–63.
"New England Business" magazine, 'NEB Reports–Energy' (Dana Bottorff), May 2, 1988, pp. 39–40.

Primary Examiner—David Smith, Jr.

[57] ABSTRACT

Electric power consumed by an a.c. induction motor is measured and sensed changes in power factor are used to modulate the combined magnetic flux produced in the motor field by two sets of RUN windings. A main RUN winding set, which normally couples fully with the a.c. power, is engineered to have sufficient ampere-turns to produce just enough magnetic flux to operate the motor with a light load and maintain a moderately high power factor. Motor driven load increases are determined by sensing a corresponding increase in the power factor of the main RUN winding set, whereupon power flow to a secondary RUN winding is proportionately increased. Considerable energy savings occurs when the motor drives a fluctuating load due to reduced magnetic field excitation under all but full load conditions, with the result that energy ordinarily wasted by eddy currents, copper losses, and poor power factor operation is considerably lessened. Other possible losses due to harmonic distortion of the a.c. power waveform brought about by the phase-delayed thyristor control of the second run winding power are mostly swamped out and masked by the parallel, always-on major power draw by the main run winding. A motor speed-sensitive switch or relay may divert current around the thyristor and fully excite the second run winding during motor start-up, thereby producing full available motor torque during start-up while negating any electrical stress on the control thyristor.

20 Claims, 9 Drawing Sheets

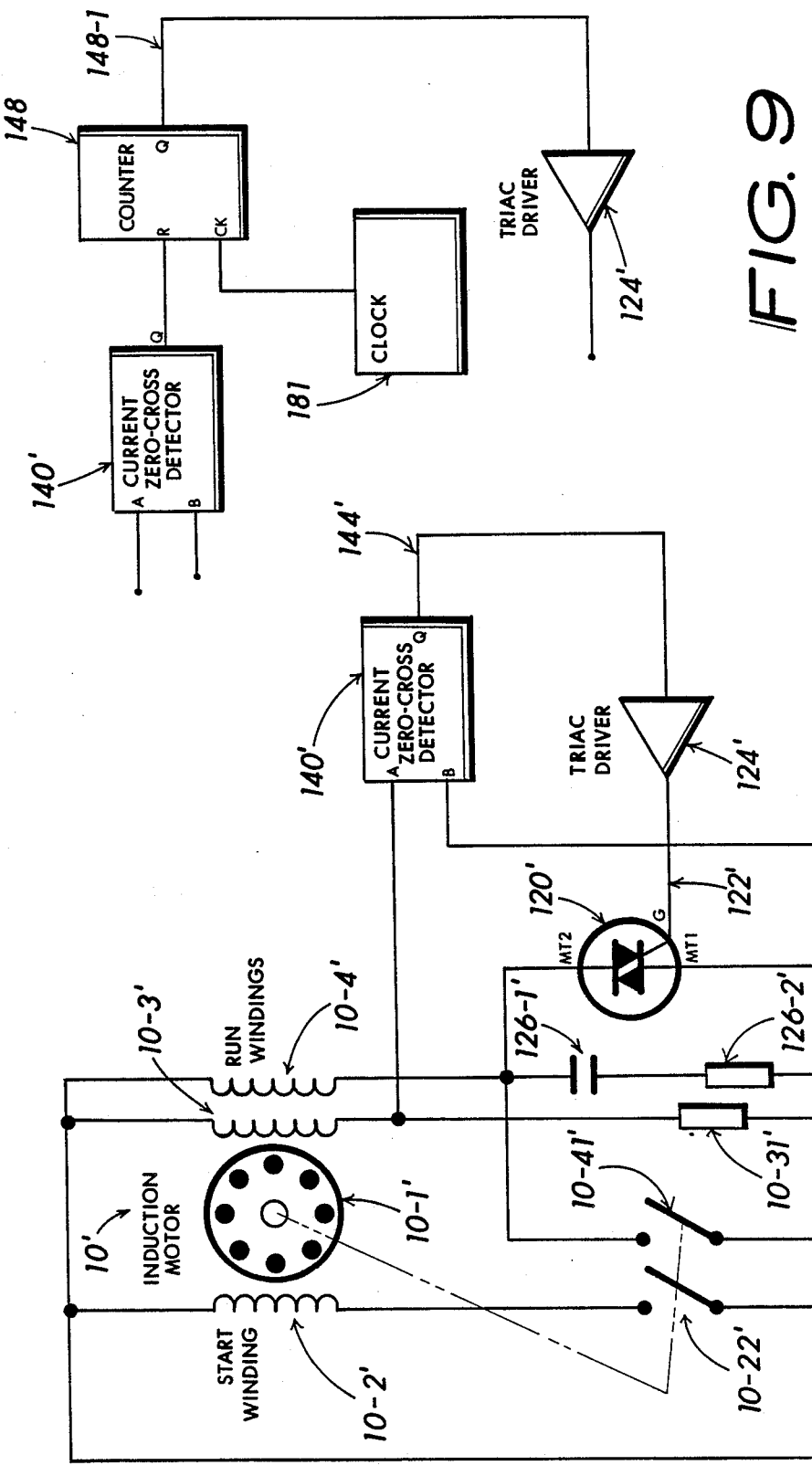

A.C. INDUCTION MOTOR ENERGY CONSERVING POWER CONTROL METHOD AND APPARATUS

FIELD OF INVENTION

My invention relates to fractional and integral horsepower electric induction motors particularly of the kind manufactured in large volume for use on major appliances, refrigerators, and air conditioners which drive a load that routinely varies over a range between full load and less than full load. The principal object for my invention is to teach a controller which serves to produce considerable ENERGY SAVINGS through load-related reduction of power flow to the motor under all but the full load conditions.

BACKGROUND OF INVENTION

A.c. induction motors find ubiquitous application in major appliances, refrigerators, air-conditioners, and other machines of all sorts. Induction motors are cheap and simple to manufacture, and have an enviable record for long-term reliability without attention. Induction motors are relatively efficient electrically, when fully loaded. When lightly loaded, they also are notorious for wasting considerable amounts of electricity by consuming far more electrical power than what they are called upon to deliver as operating torque from their output shaft. It is this later rather troublesome shortcoming of common induction motors which needs improvement, and it is believed that this invention now can offer considerable relief.

To give some scope to the impact which induction motors have on society, one may consider that "125 million household refrigerators and freezers in operation today require the electricity from 30 standard (large sized) 1,000-megawatt power plants." ("Scientific American", Vol. 258, No. 4, April 1988, Page 56, in an article 'Energy-efficient Buildings' by Arthur Rosenfeld and David Hafemeister.) Virtually all such refrigerators use induction motors. Considerable waste occurs because refrigerators do operate with varying mechanical load demands, while the typical hermetically sealed compressor assembly contains an induction motor which is sized to handle the worst case, ableit 'normal', compression load demand imposed upon it without frequent stalling. The result is simple: much of the time the motor is operating at less than full load and wasting a considerable amount of energy. Merely improving the dynamic operating efficiency of such a motor a mere ten-percent or so may result in the power saving equivalent to that afforded by 3 of the large 1,000 megawatt power plants, which are said to cost several billion dollars to construct. Some perspective of what this means can be obtained by considering an article which appeared in "New England Business" magazine, May 2, 1988, on pages 39–40 wherein the New England Power Pool (an organization which represents the region's utilities) estimates that by 1995 about 4,000-megawatts of additional generating capacity (on top of the present 23,000-megawatts of current capacity) would be needed just to keep up with demand growth. You also need to keep in mind that the highly controversial New Hampshire 'Seabrook Unit I' and Plymouth, Mass. 'Pilgram' nuclear power generating facitlities produce a combined power of only 1,820-megawatts: far less than what might be conserved through better induction motor operating efficiencies!Hence, improved efficiency in motor operation for refrigerators, air-conditioners, and other machines could down-scale the demand growth and alleviate some of the pressures which now exist in getting additional capacity on-line. Needless to say, greater improvements in motor efficiency can afford even more spectacular economic savings in power plant needs and reductions in attendant 'wasteful' consumption of non-renewable fuel resources. Such further improvement in induction motor operating efficiency is precisely what is brought about by my instant invention.

Modern induction motors are often designed to operate with very high magnetic field flux densities in the stator structure. The result is near-saturation of the core material, with high eddy current losses. In addition, the windings may be designed to operate with high current densities that results in considerable heating due to winding resistance losses. Such winding losses are further aggravated in many cheaply designed appliance motors through the use of aluminum wire in lieu of the better and generally more efficient copper wire windings. Motor design my be dictated by competitive market conditions, resulting in agressive cost cutting. Cheap designs commonly translate into producing motors having high operating levels and the result may be a motor which operates with reasonable efficiency under full load, while under light load it is a wasteful of considerable energy. High temperature rise in a lightly loaded (or unloaded) motor is a sure sign indicating poor electrical operating efficiency. Modern motors operate very hot under all conditions of loading, which translates into poor overall performance efficiency when a widely varying load is being driven by the motor.

In earlier U.S. Pat. Nos. 4,052,648 and 4,266,177 Frank Nola describes how the a.c. pwoer fed to an induction motor might be controlled and therefore bring about some improvement in electrical efficiency. While he does measure the power factor of the operating motor and therefrom determines various control values for regulating the total power input of the motor run winding set by conventional phase-angle controlled firing of a triac, he greatly reduces and in some cases may negate any purported improvement by virtue of the severe a.c. power waveform harmonic distortion which his system reflects into the electric utility system. Nola also describes apparatus which is fraught with possibilities for maladjustment and drift, and wherein the correct operating points are not pre-established by design but rather they must be somewhat tailored to each unit which might be manufactured, resulting in a relatively labor-intensive and costly product. Column 3, lines 40–47 and column 6, lines 50–66 of U.S. Pat. No. 4,266,177 particularly describes the kind of twiddling that is needed to set the device's operating points relative with any particular motor's observed performance.

In yet another U.S. Pat. No. 4,533,857, Ten-Ho Chang et al show a motor controller which in effect measures the apparent current drawn by an induction motor and therefrom develops a variously retarded phase-angle control signal which fires a triac and thus modulates the total power flow to the motor. Like Nola, Chang et al shows the turn-ON of the full motor running current at some delayed point during each a.c. half-cycle and of course such an approach is fraught with severe harmonic distortion of the a.c. power flow (as reflected into the a.c. power lines), accompanied by resulting inefficiencies that may exceed any gain which could otherwise be obtained from use of the controller. Chang also does not recognize nor allow for the common characteristic of cheap induction motors wherein the lightly loaded (or even unloaded) apparent motor current may be only a little less than what full load motor current is. Although the motor current is lagging by perhaps 60 degrees or more, the actual measurable current which develops across the current transformer (Tr-2 in Chang's teaching) will be quite nearly the same as what develops under full motor load, when the motor current might lag by 30-degrees or less. A typical appliance motor, such as the General Electric type 5KH46JR15S has been found to draw about 7.9 amperes under full load, and yet continue to draw nearly 7 amperes of apparent current under NO-LOAD. Power factor also varied from about 80–85% under FULL-LOAD, to about 20–30% under NO-LOAD. This of course means that little change in current occurs and the circuit of Chang would operate ineffectively because slight changes in a.c. line voltage bring about more substantial changes in motor current than what changes in motor load produce. Chang is silent regarding compensation of apparent motor current changes which merely relate to commonplace a.c. line voltage fluctuations.

Noise, in the form of hum and buzz, are byproducts of stressful motor operating conditions. Magnetostrictive effects tend to produce substantial noise in the motor's structure, paticularly when stressed with the strong and abrupt changes in flux brought about by phase-delayed thyristor power control. These abrupt changes in induction fields can also set up other parasitic vibrations which, aside from being audibly annoying, can lead to premature structural fatigue of the motor's components (such as a vibrating loop of wire which eventually breaks off). Refrigerators and, to a lesser extent, air conditioners are frequently annoying sources of audible noise, albeit not particularly high in the sense of loudness on the commonly cited decibel scale for noise sources. Load related modulation of power flow to such motors may therefore serve to substantially abate such undesirable noise and result in a more acceptable product.

SUMMARY

A.c. induction motors provide a very economical and time proven source of mechanical power for driving major appliances, air conditioners, and other kinds of domestic and commercial machines. The time-proven dependability of induction motors is exceptional, and years of product engineering have, in most cases, resulted in a simple and cost effective configuration using few parts. It is thus desirable to retain all these advantages of the induction motor, while coming forth with a meaningful reduction in energy waste which occurs when the motor is less than fully loaded.

Production of electric power in America is reaching a point where the utility companies in many parts of the nation will soon be nearing 100% capacity. Unless more generating capacity is soon built, brown-outs, power grid failures, and other cataclysmic power distribution events are likely to occur with increasing frequency because no reserve power capacity is available or being readied. In view of the many years it takes to get even a single new nuclear or conventional electric power generating facility on-line means that there is no quick and simple solution to this looming energy-crunch dilemma. The building of additional power plants is also a fundamentally costly proposition. Such cost can be illustrated by a 500-megawatt gas-fired power plant located in Burrillville, R.I. which cost about $320-million dollars and by a $300-million dollar plant planned for Woonsocket, R.I. which is oil-fired and produces a mere 180-megawatts. It therefore behooves manufacturers of any kind of apparatus that tends to waste a lot of electricity, relative to what it really "uses" to drive a load, to develop more ENERGY EFFICIENT schemes. Paramount in this arena of everyday power wasters are the ubiquitous induction motors, such as found on most major appliances and in air conditioners. Induction motors are subject for being 'singled out' as power wasters due to the hunge number of such motors which find extended operation every day in out modern society. They often power machines and appliances which regularly operate daily for substantial periods of time. It is common that induction motors are desired by appliance and machine designers for any application where the motor will see a lot of use, due to their time-proven reliability and nearly zero-maintenance requirements. They also lend themselves to hermetic refrigeration compressor assemblies because there are no brushes to wear out or cause contamination of the refrigerant (and oil).

Ordinary engineering practice produces induction motor designs which operate with high magnetic field flux densities, high current density through the windings, and with a minimum of structure. The General Electric 'Form V' industry standard no. 4096 motor, typically used with Whirlpool and Kenmore brand electric clothes dryers is representative of such minimal modern design practice. Producing about ⅓ horsepower, this motor draws about 5.6 amperes (full load), while under reduced load the apparent motor current remains about 5 amperes, albeit the power factor decreases substantially. Clearly it would be advantageous if the apparent motor current were to reduce in approximate relation with load decrease, while at the same time the power factor remains about constant. Without dynamic control of the motor operating conditions, such relatively constant power factor operation is unattainable in induction motors of ordinary (and economimcally cheap) design. My instant invention now teaches a controller which can expedite such a desirable characteristic from virtually any cheap motor design through the mere inclusion of two sets of RUN windings, one of which is constantly excited to provide sufficient magnetic field flux to drive the motor's rotor under reduced load conditions, while the other RUN winding is increasingly excited as the load increases. The combining of the separate magnetic fields produced by the two RUN winding sets serves to provide a variable operating flux density in the motor which is just sufficient to keep the motor running without stalling under any load condition between that of reducd load and full load, while at the same time economizing on the use of electrical energy. The inclusion of the second set of RUN windings in even cheap motors such as the aforementioned General Electric 'Form V' or a 'Form J' style imposes no significant manufacturing difficulty because the meter inclusion of a second set of RUN windings is little different from the manufacturing practice involved in winding separate START and RUN windings in the first place: e.g., the maker merely winds three sets of windings (with the two RUN windings being wound with somewhat lighter gauge wire) instead of the usual two winding sets.

DESCRIPTION OF DRAWINGS

My invention is illustrated with nine sheets of drawings showing twelve figures.

FIG. 8 - Circuit for providing limited thyristor control range for the secondary RUN winding.

FIG. 9 - Circuit which adapts the circuit of FIG. 8 to give a different thyristor phase delay control range.

DESCRIPTION OF MY INVENTION

My invention involves the use of an induction motor of ordinary commercial design which has been engineered to include two (or more) RUN winding sets. Ordinarily, a main RUN winding set is coupled directly with the a.c. power source, while a secondary RUN winding set is variably coupled through a thyristor with the a.c. power source. The main RUN winding set is predetermined to have sufficient ampere/turn capacity to produce the flux density to excite the motor field and achieve normal operation for light motor loads. The secondary RUN winding set is further predetermined to have sufficient additional ampere/turn capacity to produce additional magnetic field flux density which adds with the main RUN winding set flux density so as to obtain reliable operation of the motor in the range between that of a light load, which is excited by the main RUN winding set alone, up to a condition of full motor load. The main RUN winding set ordinarily is of more substantial construction, thereby providing a greater portion of the motor's total magnetic field excitation. A.c. phase control, or variable-phase power control as referred to in my invention is used in the general context which is more particularly explained in technical literature, such as in the General Electric Co. (Syracuse, N.Y.) "SCR Manual", 4-th Edition, Edited by F.W. Gutzwiller (especially sections 9 and 10).

Figure 1:
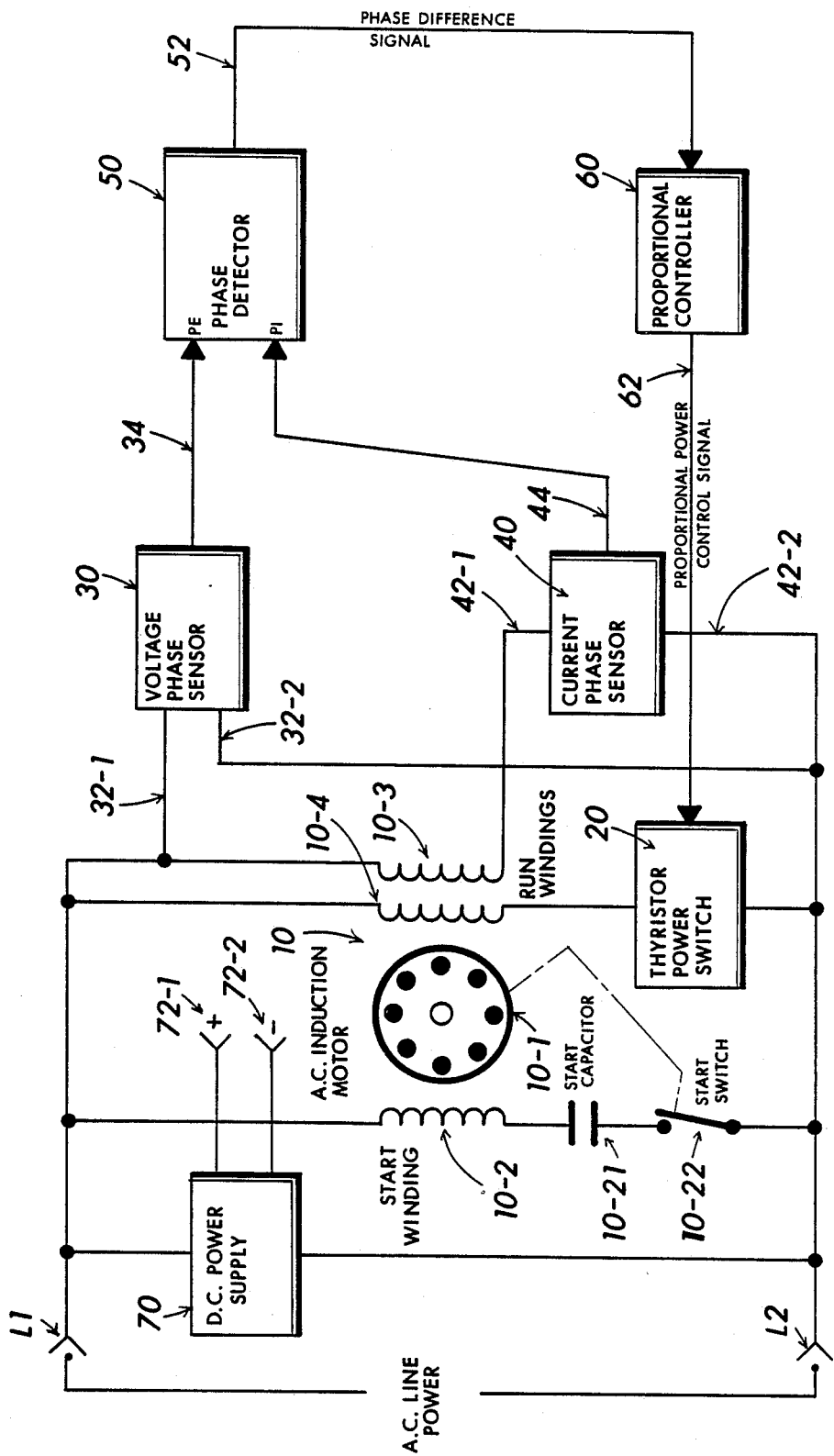
FIG. 1 - Functional diagram showing principal elements which comprise my invention.

In FIG. 1 the a.c. induction motor 10 is provided with a rotor 10-1 (that functionally drives a mechanical load which is not shown), a START winding 10-2, a main RUN winding 10-3, and a secondary RUN winding 10-4. In addition, the motor may include a 'start' capacitor 10-21 and a centrifugal 'start' switch 10-22. The main RUN winding couples directly with the a.c. power line L1, and through the current phase sensor 40 with power line L2. Thus, the main RUN winding is fully excited by the a.c. line power.

A voltage phase sensor 30 couples via lines 32-1, 32-2 with the a.c. power lines L1, L2 and produces a 'voltage phase' signal on line 34 that couples with the input PE of the phase detector 50. Current flowing through the main RUN winding 10-3 also couples through the current phase sensor 40 (via lines 42-1, 42-2) which produces a lagging 'current phase' signal on line 44 that couples with the input PI of the phase detector 50.

The phase detector 50 determines the phase difference between the 'voltage phase' (reference) signal and the lagging 'current phase' (error) signal, producing a phase difference signal on line 52 that couples with a proportional controller 60. The proportional controller functions to determine a range of proportional power control signals on line 62 in response to changes in the phase difference signal provided on line 52. The proportional controller usually determines the outputted signal on line 62 to have a larger dynamic range of electrical degrees of change than what is presented on the input signal line 52. It is common that an induction motor may have a range of lagging current which extends between about −20 degrees and −60 degrees (for example). Meanwhile, it is usually desirable that the thyristor 20 be enabled to phase control the power coupled with the secondary RUN winding 10-4 over a much wider range: say from about −0 to −180 degrees. In fact, in may practical motor applications it may be desirable to obtain the full 180 degree control of the thyristor gate delay with a mere 10 to 20 degree variation in motor current phase leg. How this expanded phase control variation is produced is one of the important aspects of my invention which shall be further explained.

A d.c. power supply 70 provides a source of low d.c. voltage 72-1, 72-2 for operation of the attendant electronic circuits which comprise the operational circuits that make up my invention.

Figure 2:
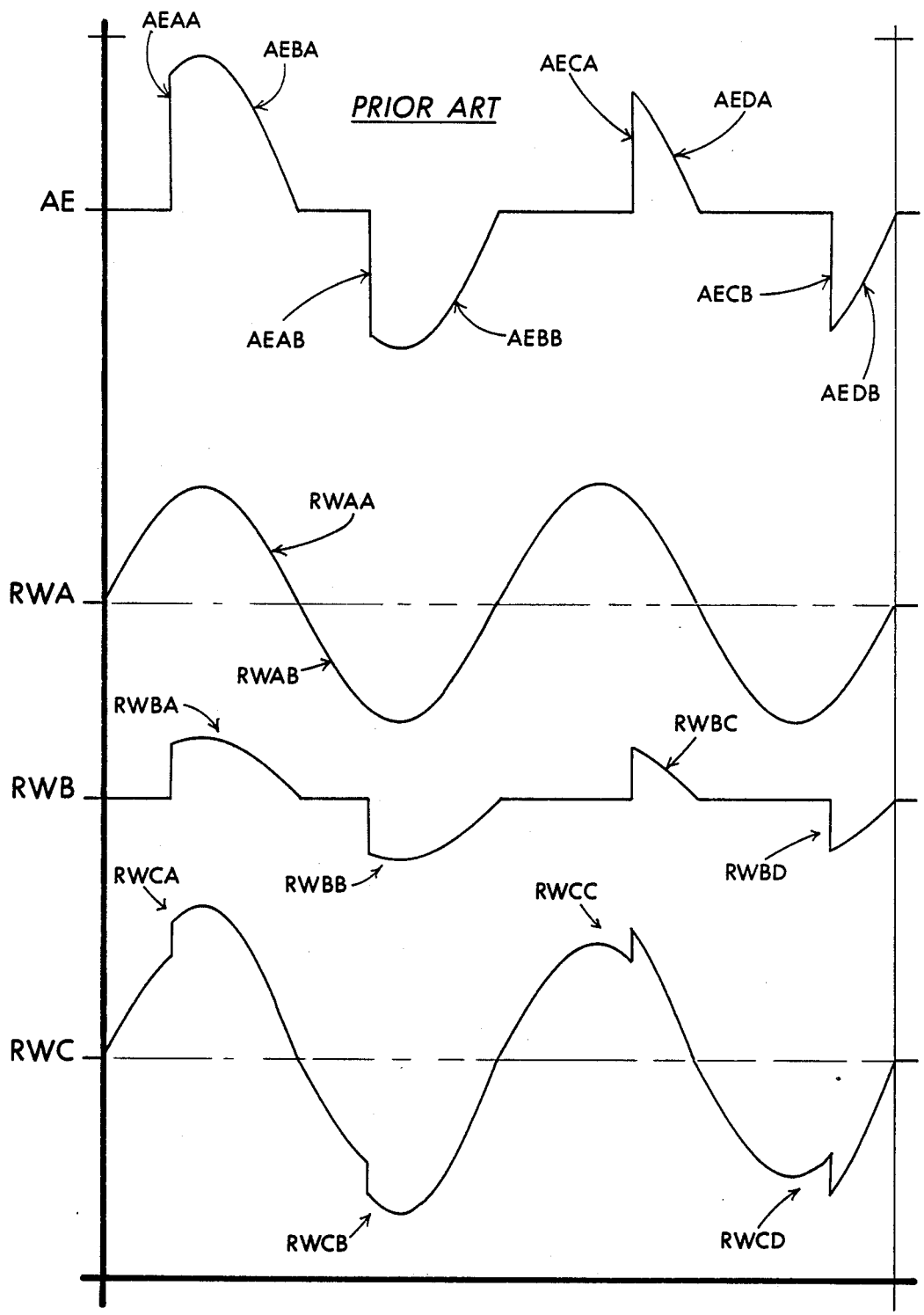
FIG. 2 - Waveforms depicting signals which are essential for understanding the advantageous performance of my invention.

In FIG. 2 I depict some waveforms which may give better understanding of my invention's central improvement. The waveform AE is typical of the kind of a.c. power control afforded by the earlier teachings of the mentioned Nola and Chang et al patents. You will see that the abrupt phase controlled turn-ON portion AEAA of the waveform AEBA gives rise to sudden changes in a.c. line conditions, and that these changes occur for every power half-cycle such as shown AEAB for the other half-cycle AEBB. When the phase-delay is even greater (in excess of −90 degrees), the half-cycle waveforms AEDA, AEDB are shown to have even shorter and more severe turn-ON AECA, AECB pulse transistions which cause the sudden power changes reflected into the a.c. power line to look almost like 'spikes'. The result of such operation is power loss caused by the severe harmonic distortion of the power line waveforms, resistance losses due to the high current surge once turn-ON occurs, electrical noise, 'flickering' of lights connected with the same power line, and other undesirable effects.

With my invention, the main RUN winding (such as winding 10-3 of FIG. 1) is fully excited by the a.c. waveform RWA of FIG. 2. This results in a symmetrical power flow RWAA, RWAB having negligible distortion. The controlled secondary RUN winding (such as winding 10-4 of FIG. 1) is partially excited by a thyristor controlled power flow represented by waveform RWB. In this case, the half-cycle waves are abruptly turned-ON RWBA, RWBB by the thyristor, and when sufficiently delayed may even appear like short 'spikes' RWBC, RWBD. When combined with the steady, full-cycle power draw RWA of the main winding, the controlled power flow RWB is merely a portion of the total power flow, as shown by waveform RWC. The composite waveform RWCA, RWCB represents that of the steady power draw RWA combined with the controlled power draw RWB. In a like way, the waveform portion RWCC, RWCD shows the combination of the steady power draw RWA with the abrupt spikes RWBC, RWBD of waveform RWB. You should take particular note of the minimal effect the phase controlled secondary RUN winding power draw has on the overall waveform character, as shown by the composite waveform RWC. The improvement is surprising and leads to a remarkable increase in operating efficiency of my invention over that of the prior art.

Figure 3:
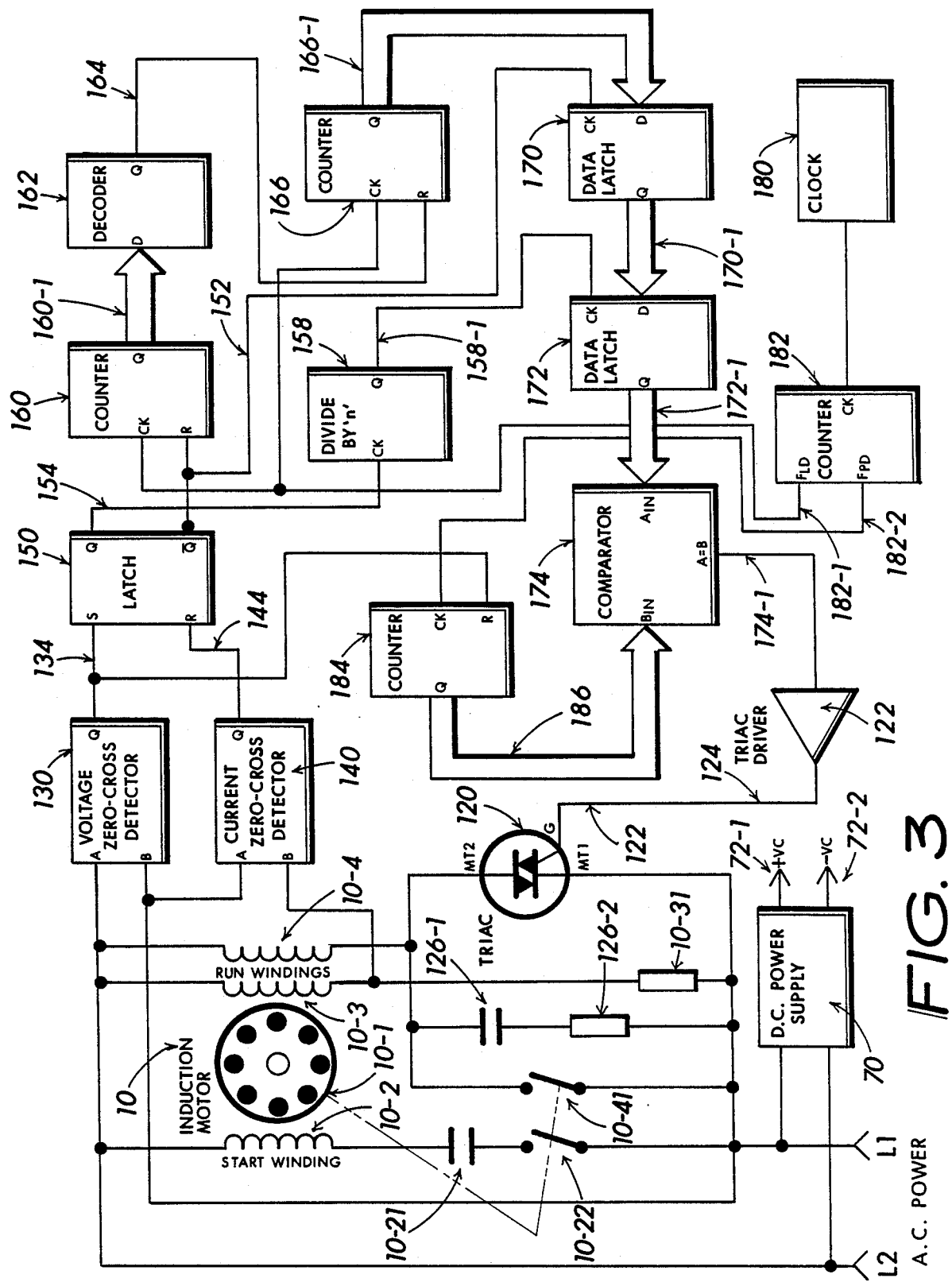
FIG. 3 - Operational diagram showing general circuitry configuration which enables practice of my invention.

A circuit overview for my invention appears in FIG. 3 and includes an induction motor 10 and the attendant RUN windings 10-3, 10-4. The main RUN winding 10-3 couples through a resistor 10-31 to the a.c. power line: the result is a voltage drop across the resistor having a phase relationship which mirrors the lagging current flow through the main RUN winding. The secondary RUN winding 10-4 couples with a triac 120, which includes a gate 122 that may turn the triac ON to obtain power flow from the a.c. power lines L1, L2. The capacitor 126-1 and resistor 126-2 operate as a snubber network to protect the triac against problems which may arise due to fast-rising voltage changes which may occur when the driven load appears inductive (e.g., fast dv/dt changes which can produce erratic commutation). The additional set of switch contacts 10-41 operate in concert with the 'start' switch contacts 10-22 and therefore are closed during motor starting. The contacts serve to bypass the heavy start-up current rush around the triac 120. This novel arrangement protects the triac from unecessary abuse and enables the use of a motor economical, smaller rated triac because it has to merely handle the secondary RUN winding current when the motor is properly running, and not the excess current drawn during motor starting.

Inputs 'A' and 'B' of a voltage zero-cross detector 130 couple essentially with the a.c. line voltage (waveform E of FIG. 4) which appears across the line terminals L1, L2. A brief pulse signal (waveform XE of FIG. 4) is produced on line 134 each time the voltage waveform EA, EB goes through zero EXA, EXB (e.g., two pulses per cycle). The voltage pulse on line 134 couples with the SET input of a flip-flop latch 150, which when 'set' produces a HIGH logic level on the Q output Inputs 'A' and 'B' of a current zero-cross detector 140 couple with the a.c. voltage signal (waveform I of FIG. 4) which develops as a voltage drop across resistor 10-31 due to (lagging) current flow in the run winding 10-3. As a result, two pulses (waveform XI of FIG. 4) are produced on line 144 for each a.c. current cycle. As depicted in the waveform XI, the pulses XIAA, XIAB coincide in time with the less-lagging current waveform IAA, IAB zero-cross coincidence IAXA, IAXB. When the current lags more (as brought on by reduced power factor, or lighter motor loading) as shown by waveform IBA, IBB the zero cross pulses XIBA, XIBB shift in relative time to coincide with the zero-crossover coincidence IBAX, IBXB of the current waveform. In practice of my invention, the timing of the current zero-cross pulses XIBA, XIBB constantly shift about in time relative with the voltage zero-cross pulses XEA, XEB. The pulses produced on lien 144 then couple with the RESET input of the flip-flop 150, and when reset has ocurred a LOW logic level appears on the Q output. As shown by waveform LQ of FIG. 4, the latch 150 /Q output 152 signal (waveform LAA of FIG. 4) is set LOW by the voltage zero-cross, is held low for a period of time, and then returns HIGH (depicted by waveform LBA1, LBB1 or LBA2, LBB2 of FIG. 4) when the current zero-cross pulse XIAA, XIAB (or XIBA, XIBB) occurs.

Figure 4:
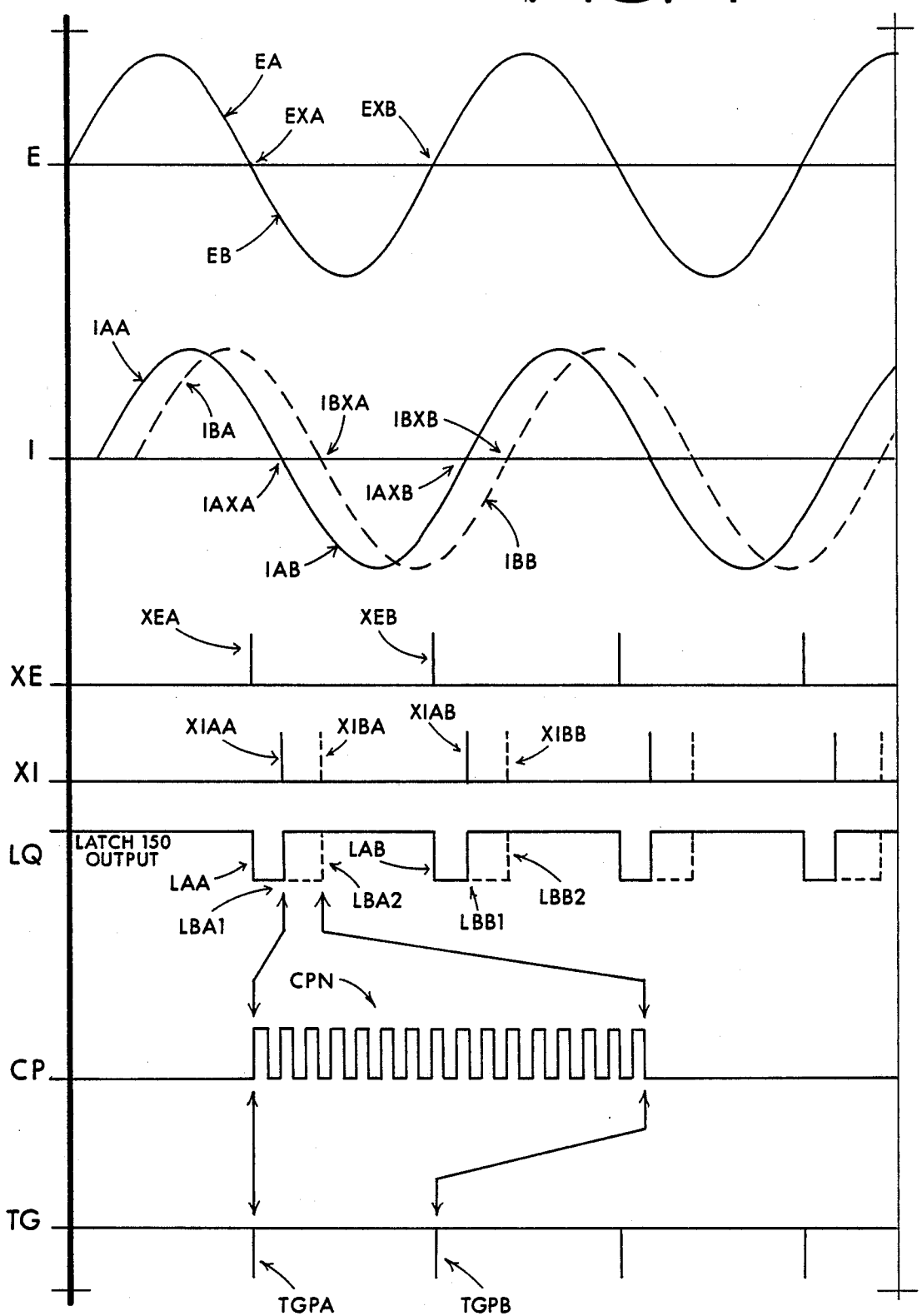
FIG. 4 - Waveforms depicting signals which are found in the circuitry configuration shown in FIG. 3.

The /Q output 152 from latch 150 couples with the RESET input of a delay counter 160. The delay counter is clocked from pulses on line 182-1 and is predetermined to count-up to a preestablished value on bus 160-1 which produces a LOW output from the decoder 162 on line 164 that couples with the RESET input of counter 166. It is my intent that counter 160 'delays' the onset of counter 166 operation for a brief period of time which coincides with the least value of lag delay (e.g., highest power factor) which may be reasonably expected from the induction motor load. When RESET of counter 166 goes 'low' the counter will be clocked and advance by 0 to 15 counts (for example) depending upon the time which lapses between the decoder producing a LOW signal on line 164, and the occurrance of the next zero-cross current pulse. If current lag is relatively large (as with a light motor load) counter 166 advances further than what has time to do if the motor is more heavily loaded and the current lag is less. Waveform CP of FIG. 4 shows the relationship between the clock pulses CPN and the variations in timing of the current signal produced reset of latch 150 as depicted by waveforms LBA1 and LBA2.

The advanced states on the counter 166 output bus 166-1 couple with the DATA input of an edge triggered latch 170. The input data is thus transferred to the output bus 170-1 the instant the /Q output of latch 150 goes HIGH. Latch 170 thusly serves to store the most recent count value while the counter 166 is recounting during the next time period. In order to produce symmetrical a.c. power control (which acts to reduce harmonic distortion and line imbalance losses) I provide that each controlled a.c. power cycle is self-completing: i.e., the first and second half-cycles are of about the same duration. A divide-by-two flip-flop 158 is clocked from the latch 150 Q output LOW-to-HIGH transistions, producing a pulse on line 158-1 the transistion of which is in-phase with the a.c. power voltage phase. The resulting pulse serves the CLOCK the edge-triggered data latch 172 that effectively transfers the byte signal on bus 170-1 to bus 172-1 once during every a.c. power voltage phase cycle.

A clock 180 produces a relatively high-frequency signal which is divided-down by the counter 182, producing a signal of necessary frequency to clock counters 160 and 166. In addition, a lower-frequency signal (say 1,920 hertz for 60 hertz a.c. power) couples with the CLOCK input of a 4-bit counter 184. The RESET input of the counter couples with the voltage zero-cross pulse signal on line 134, and is therefore reset at the onset of each a.c. power half-cycle. After reset, the counter quickly advances from count '0' to count '15' (binary 0000 to binary 1111) on bus 186. A comparator 174 receives an A-IN signal from the latch 172 output data bus 172-1 and a B-IN signal from the counter 184 output bus 186. When the counter 184 'counts-UP' to a binary weight signal that equates to the stored binary signal appearing on bus 172-1, coincidence of A=B in the comparator produces a HIGH pulse signal on output 174-1 that couples through the triac driver 124 to produce a signal on line 122 that operates the gate of the thyristor 120 to effectively turn the thyristor ON during the rest of the instant a.c. power half-cycle. Waveform TG in FIG. 4 depicts the thyristor gate turn-ON signal pulse timing relative with the plural clock pulses CPN. To interpret this waveform, it shall be seen that the pulse TGPA occurs at the onset of the a.c. power 180-degree half-cycle when the signal on bus 172-1 is binary 0000 because coincidence occurs in the comparator immediately at the start of the half-cycle. Conversely, if the signal on bus 172-1 has a binary weight of 1111 then counter 184 must count-UP 16 steps and thus coincidence in the comparator is delayed in time until near the end of the half-cycle, as depicted by pulse TGPB. Of course different byte signal weights on data bus 172-1 will produce pulses having timing intermediate of TGPA and TGPD (i.e., laying between about 0- and 180-degrees of electrical phase delay prior to thyristor 120 turn-ON.

A computer program can serve to develop the best clock frequency choices, as determined by specifying a range of minimum and maximum current phase delay (e.g., power factor range). Furthermore, the values can be optimized to restrict the dynamic range of thyristor control. For example, the values can be determined such that the thyristor always operates over a range of phase delays considerably less than the full 0- to 180-degree maximum capability. The following program may be utilized for such operative selections:

```
10   'DETERMINATION FOR CLOCK FREQUENCY OF PHASE-LAG COUNTER @:CFPLC.BAS V1.0
20   '(c) H. Weber -=- K1VTW -=- 4/11/88 -=- CP/M-80 -=- MBASIC-80 -=- DEC VT-180
30   GOSUB 650:GOSUB 660
35   PRINT:GOSUB 645
40   PRINT "THIS PROGRAM WILL QUICKLY DETERMINE THE CLOCK FREQUENCY FOR THE"
50   PRINT "PHASE-LAG ACCUMULATOR COUNTERS RELATIVE WITH DIFFERENT POWER FACTORS."
55   GOSUB 645
60   GOSUB 670
70   INPUT "LOAD Motor Model No. or Description: ",MN$
80   IF LEN(MN$)>30 THEN 30
90   PRINT:INPUT "Enter MAXIMUM LOAD Current Lag in Degrees ",PFA
100  IF PFA>90 OR PFA<0 THEN 90
110  PRINT:INPUT "Enter MINIMUM LOAD Current Lag in Degrees ",PFB
120  IF PFB>90 OR PFB<0 THEN 110
130  IF PFA>PFB THEN 90
140  PRINT:INPUT "Accumulator Counter Division Factor 'n' ",NF
150  IF NF<2 OR NF>256 OR NF>INT(NF) THEN 140
160  PRINT:INPUT "Enter Power Line Frequency (Hertz) ",LF
170  IF LF<25 OR LF>400 THEN 160
180  PRINT:INPUT "Enter MINIMUM Thyristor Gate Delay (Degrees) ", PDL
190  IF PDL<0 OR PDL>180 THEN 180
200  PDR=180-PDL=PDR/(NF-1)
210  PFR=PFB-PFA:PFS=PFR/(NF-1)
220  FCK=(2*LF*NF)*(180/(PFB-PFA)*(180/(180-PDL))
230  PCK=LF*2*NF
240  CDV=FCK/PCK:CDN=INT(CDV)
250  IF CDV>CDN+.5 THEN CDV=CDN+1 ELSE CDV=CDN
260  GOSUB 650:GOSUB 660
270  PRINT "LISTING OF THYRISTOR TRIGGER DELAY RELATIVE WITH MOTOR CURRENT LAG."
280  GOSUB 620
290  PRINT "|";:PRINT TAB(6) "Motor Current";:PRINT TAB(20) "|";
300  PRINT TAB(25) "Thyristor";:PRINT TAB(40) "|";
310  PRINT TAB(41) STRING$(38,"~");:PRINT TAB(80) "|"
320  PRINT "|";:PRINT TAB(6) "Lag, Degrees";:PRINT TAB(20) "|";
330  PRINT TAB(23) "Conduction Angle";:PRINT TAB(40) "|";
340  PRINT TAB(43) "Clock Frequency:";:PRINT TAB(61) FCK;
350  PRINT TAB(73) "Hertz";:PRINT TAB(80)"|"
360  GOSUB 640
370  FOR AA=1 TO 16
380  PRINT "|";:PRINT TAB(7) "-"; (PFA)+((PFS*AA-PFS);
390  PRINT TAB(26) (PDL+(PDS*(AA)-PDS);
400  PRINT TAB(40) "|";
410  IF AA=1 THEN PRINT TAB(43) "MIN. Current Lag:";:PRINT TAB(63) "-";PFB;
420  IF AA=1 THEN PRINT TAB(71) "Degrees";
430  IF AA=3 THEN PRINT TAB(43) "MAX. Current Lag:";:PRINT TAB(63) "-";PFA;
440  IF AA=3 THEN PRINT TAB(71) "Degrees";
450  IF AA=5 THEN PRINT TAB(43) "Counter Factor 'N':";:PRINT TAB(64) NF;
460  IF AA =5 THEN PRINT TAB(72) "Stages";
470  IF AA=7 THEN PRINT TAB(43) "Gate Delay Counter";
480  IF AA=8 THEN PRINT TAB(43) "Clock Frequency:";:PRINT TAB(62)PCK;
490  IF AA=8 THEN PRINT TAB(73) "Hertz";
500  IF AA=10 THEN PRINT TAB(42) FCK "Hz/" PCK "Hz,";
510  IF AA=11 THEN PRINT TAB(45) "Rounded Off =";:PRINT TAB(64) CDV;
520  IF AA=11 THEN PRINT TAB(72) "Counts";
530  IF AA=12 THEN PRINT TAB(41) STRING$(39,"-");
540  IF AA=13 AND MN$>""THEN PRINT TAB(43) "Listing Based on Motor Model:";
550  IF AA=14 THEN PRINT TAB(43) MN$;
560  IF AA=50 THEN PRINT TAB(41) STRING$(39,"~");
570  IF AA=16 THEN PRINT TAB(43) "(c) Harold J. Weber ++ April 1988";
580  PRINT TAB(80) "|"
```

```
-continued
590     NEXT AA
600     GOSUB 620
610     END
620     PRINT "|";:PRINT STRING$(38,"—");:PRINT "|";
630     PRINT STRING $(39,"-");:PRINT "|";:RETURN
640     PRINT "|";:PRINT STRING$(38,"—");:PRINT "|";:PRINT TAB(80) "|";:RETURN
645     PRINT STRING$(70,"-"):RETURN
650     PRINT CHR$(27)"[2J";:RETURN 'Clear Screen (CLS) | ANSI Settings
660     PRINT CHR$(27)"[H";:RETURN 'Home Cursor (HOM) | for DEC VT-180
670     PRINT CHR$(27)"8;1H";:RETURN 'Position Cursor | Computer
```

D.c. power is provided on lines 72-1, 72-2 as produced by a d.c. power supply 70 that couples with the a.c. line L1, L2.

Figure 6:
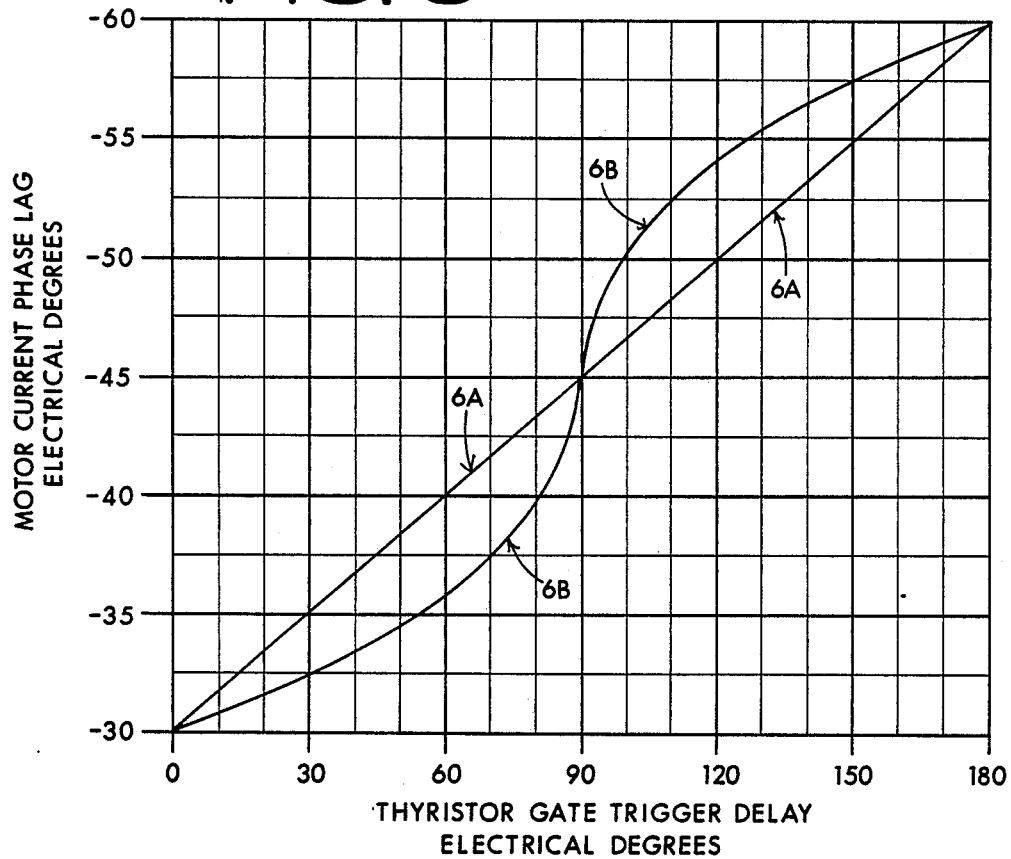
FIG. 6 - Graphical plot of change in thyristor gate control signal delay relative with motor current phase lag.

The control of power flow between the a.c. source and the second RUN winding follows a relatively straight-line character when practiced with the hookup of FIG. 4. Curve 6A of FIG. 6 depicts the general relationship between thyristor trigger gate delay and sensed changes in motor current lag.

Figure 5:
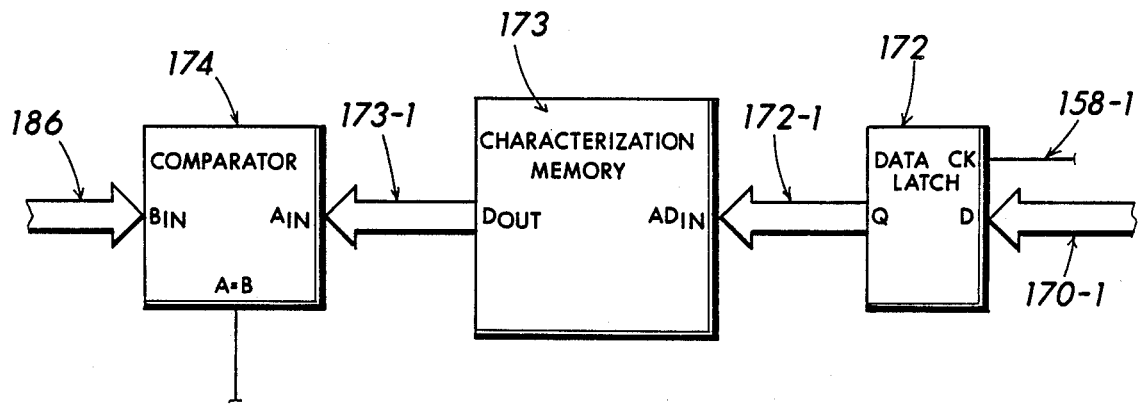
FIG. 5 - Modification of general circuit configuration of FIG. 3 to include a memory device which modifies the controller's dynamic characteristics.

The relationship between the gate delay and motor current phase lag may be advantageously modified into substantially any reasonable non-linear relationship through the inclusion of a characterization memory 173 as shown in FIG. 5, which is coupled between the output bus 172-1 of latch 172 (of earlier FIG. 4) and the A-IN input of comparator 174 as provided on the memory output bus 173-1. Through artful predetermination of the characterization memory's stored states, the data brought forth on the memory's output D-OUT as delivered on the output bus 173-1 may be compensated relative with the data present on the data bus 172-1 coupled with the memory's input AD-IN (which serves to address the memory cells) so as to produce control of the motor's second RUN winding current in such a way that best overall smoothness of control is obtained. Memory 173 may be a relatively small ROM (Read-Only Memory) or PROM (Programmable ROM): for example, if data provided by the latch 172 is 8-bits wide the memory merely needs to be 256-bytes (e.g., 2048 bits). Curve 6B of FIG. 6 depicts a modified transfer characteristic for the controller which may be obtained through the characterization memory's predetermined data contribution to the earlier FIG. 4 hookup. However, virtually any transfer characteristic can be obtained through preset programming of the memory.

Figure 7:
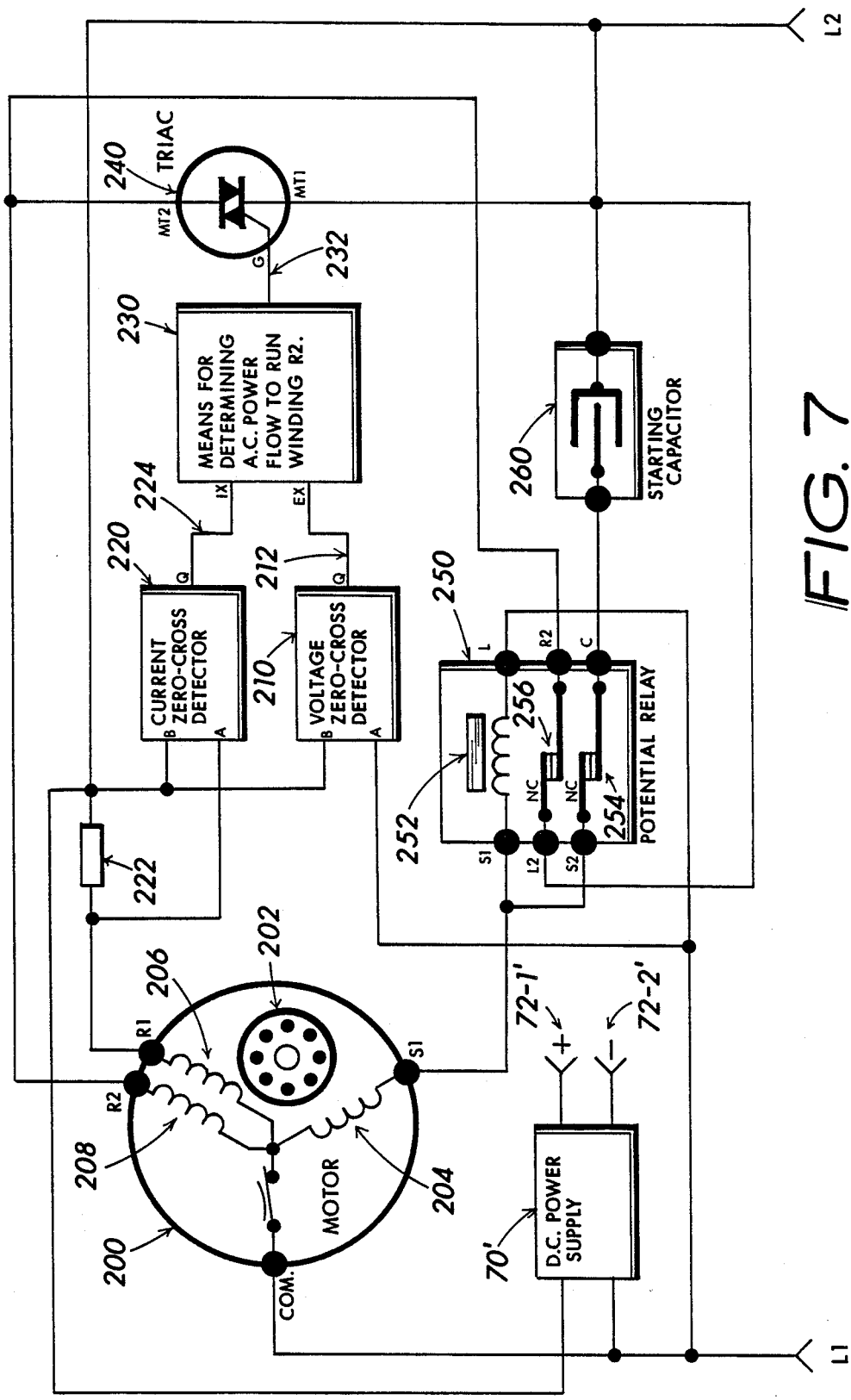
FIG. 7 - Hookup of electrical elements of a typical refrigerator with my invention's control circuits.

A wiring hookup which typifies a common refrigerator or small air conditioner is shown in FIG. 7 to include a hermetic motor-compressor unit 200 which has a rotor 202 that drives the compressor. A START winding 204 is provided, together with a first RUN winding 206 and a second RUN winding 208. The voltage which appears between the line terminals L1, L2 also couples with the voltage zero-cross detector 210, producing a pulse on line 212 concurrent with each half-cycle voltage phase reversal. Current flow through the first RUN winding 206 also flows through a sense resistor 222, where the voltage drop developed thereacross by the lagging RUN winding current flow is coupled with a current zero-cross detector 220, producing a pulse on line 224 concurrent with each current half-cycle phase reversal.

I provide a means 230 for determining a.c. power flow to the run winding R2 which receives the zero-cross pulses on lines 212, 224 (inputs EX and IX respectively), and therefrom determines the timing for the pulses on line 232 that drives the gate of the triac 240. Operation is such that any increase in RUN winding current flow lag (which generally indicates reduced motor loading) results in an increase in delay of the triac gate trigger pulse; e.g., the triac turns-ON later in the half-cycle.

As is usual practice with refrigeration motors, a potential relay 250 is utilized for starting the motor. The contact set 254 is initially closed, and current flows to the START winding 204 and the starting capacitor 260. When the motor speed builds-up, the voltage increases across the START winding exciting the relay field 252, which pulls the armature in separating the contact set 254 and ending START winding current flow. Another set of contacts 256 which are initially closed mechanically operate in conjunction with the start contact set. The contact set 256 connects in parallel with the triac 240, serving to shunt the heavy current flow which occurs during motor starting away from the triac. D.C. power for circuit operation is provided by a power supply 70', producing the d.c. power on lines 72-1', 72-2'.

The second RUN winding may be modulated with considerably less than full half-cycle variation and produce good power reduction to the motor. This unique ability comes about because most of the operating flux for the motor field is produced by the first RUN winding, while the second RUN winding merely has to supplement the field strength in approximate proportion to changes in motor loading, as detected through power factor changes. FIG. 8 shows a split-phase motor 10' having a rotor 10-1', START winding 10-2', and two RUN windings 10-3', 10-4'. A current sensing resistor 10-31' couples between the a.c. power line L1 and the first RUN winding 10-3'. The voltage developed across the resistor couples with the current zero-cross detector 140', producing a pulse on line 144' each time the current cycle reverses phase (e.g., two pulses per cycle). This pulse is coupled through a traic driver 124', providing a signal on line 122' that directly drives the gate of the triac 120'. In effect, the lagging current phase is compared with the zero-cross timing of the voltage phase of the a.c. power signal which serves to commutate the triac 120'. This of course is obviously equivalent to determining phase relationships through the use of a separate voltage zero-cross detector, such as element 130 of FIG. 3. In this arrangement of my invention, the motor load dependent variation in RUN winding current lag is all the variation which is submitted to the triac gate for modulation of the second RUN winding 10-4'. In practice, the motor current may vary from about 30 degrees to about 60 degrees, and thus the power coupled through the triac will vary by the same amount and over substantially the same range: e.g., about 30 degrees of maximum variation. When the first RUN winding is sized to be very much dominant, the second RUN winding may serve to add 0- to about 15-percent of the overall motor operating flux, and the modulation of the winding with this reduced angular variation of the power cycle provides sufficient control.

Figure 10:
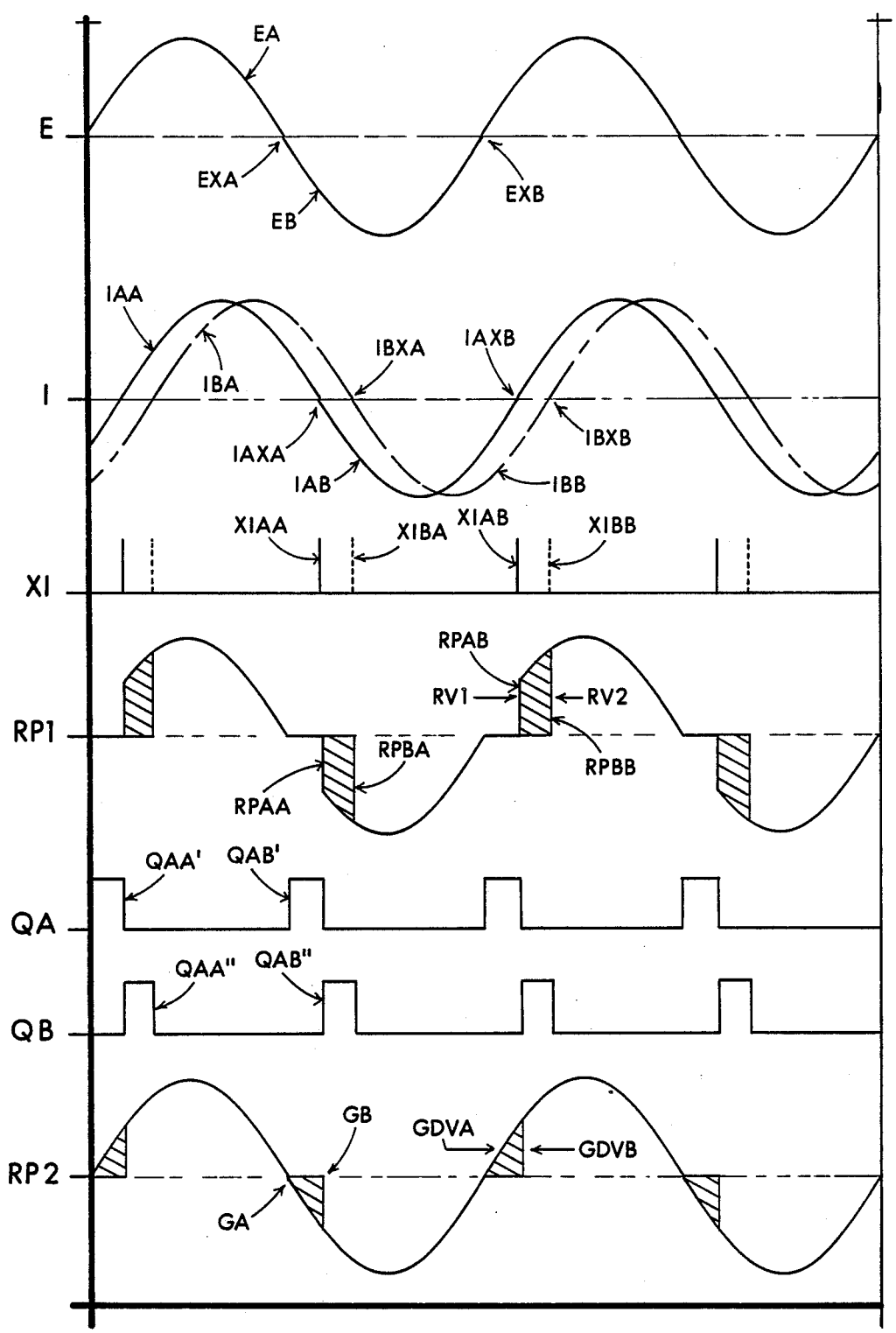
FIG. 10 - Waveforms depicting signals which are found in the circuitry configurations of FIG. 8 and FIG. 9.

The curves E, I, and XI of FIG. 10 are similar to those of FIG. 4, whereas the curve RP1 shows how the FIG. 8 controller produces a variation in the turn-ON range of the power cycle. A fully loaded motor has smallish current phase lag, say about 30-degrees, and the triac will turn-ON RPAA, RPAB early in the power cycle RP1. When more lightly loaded, the RUN current lags more and this translates into the triac being turned-ON RPBA, RPBB later in the power cycle RP1. The variation in current lag (or power factor) produced by load variations serves to vary the triac turn-ON over the dynamic range RV1 to RV2.

Through the inclusion of a phase delay counter 148, which is driven by a clock 181 in FIG. 9, I produce a retarded pulse signal transistion on line 148-1 that couples with the triac driver 124' to serve to turn the triac ON at a different phase angle timing other than the instant of current phase lag zero-crossover, as was done in the teaching of FIG. 8. Representative circuit timing is depicted in FIG. 10, where the waveform QA represents the output from the counter 148-1 which is obtained when the current phase-lag is small. The counter is effectively RESET by the output from the zero-cross detector 140', driving the QA output signal QAA to logic LOW. The reset counter then counts for a finite period of time, which when completed produces a LOW-to-HIGH transistion QAB that serves to turn the triac ON (in this case at the onset GA of the next half-cycle, shown in waveform RP2). A more retarded lagging current signal resets the signal QB at the time QAA', and like before counting occurs and timely produces the LOW-to-HIGH transistion QAB' that turns the triac ON (later GB in the next half-cycle). Dynamic variation then extends between GDVA to GBVB. Through different counter 148 choices, or clock rates, the thyristor turn-ON can be arranged for any reasonable point in the cycle subsequent to the occurance of the current zero-cross pulse. Setting the count so that the 30-degree (or so) range of control occurs during the middle 30-degrees of each a.c. power half-cycle makes for the largest change in second RUN winding power.

Figure 11:
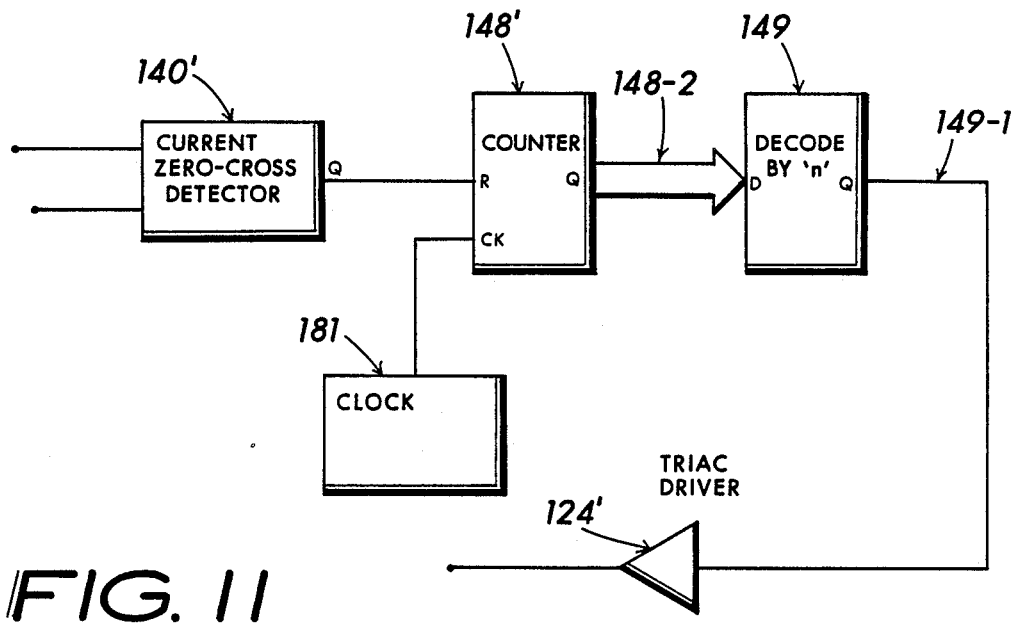
FIG. 11 - Circuit which adapts the circuit of FIG. 8 to skew the thyristor phase delay control range even into the next half cycle.

The inclusion of a decoder 149 that couples with the counter 148' is shown in FIG. 11, and is desirable to allow more precise phase delay control. The output 148-2 form the counter (which ordinarily includes one line for each counter stage) couples with the input of a DECODE-BY-'n' decoder 149 which can be predetermined to respond to any number of counts from one up to any reasonable number. As an expedient for the artisan who may attempt to duplicate the fruits of my invention, the following BASIC computer program can quickly serve to determine;

a. the value 'n' for the decoder 149;
b. the number of stages for counter 148';
c. the relationship of the CLOCK 181 Frequency relative with the counter stages and decoder value;
d. the relationship of various power factor related phase delays with circuit predeterminations; and,
e. the relationship of triac gate signal phase skew with other circuit predeterminations.

By entering the value of clock frequency, phase lag values, and desired skew the best operating values for the circuit of FIG. 11 can be found. The best circuit conditions may also be found which provide for mid-cycle control range of the next a.c. power half-cycle, thus providing for optimal dynamic range.

```
10    'PROGRAM FOR DELAYED CYCLE PHASE CONTROL @:DCPC1.BAS
20    'Copyright 5/6/88 H. Weber K1VTW MBASIC-80 CP/M-80 DEC VT-180 V1.0
30    '----------------------------------------------------------------
40    PRINT:GOSUB 1000:GOSUB 1010
50    PRINT:GOSUB 1020;:PRINT "QUICK-DETERMINATION OF FIG. 11"
60    GOSUB 1020;:PRINT " DECODER and COUNTER PARAMETERS"
70    PRINT:PRINT:PRINT "What is the POWER LINE FREQUENCY ?? (In HERTZ)";
80    PRINT TAB(60);:INPUT LF
90    IF LF<50 OR LF>400 THEN 40
100   PRINT:PRINT "Do You Want to delay Thyristor Turn-ON"
110   PRINT "Into NEXT Half-Cycle ? )Y( or )N("
120   PRINT TAB(60);:INPUT AFL$
130   IF AFL$="N" OR AFL$="n" THEN FLA=1:GOTO 160
140   IF AFL$="Y" OR AFL$="y" THEN FLA=0:GOTO 160
150   GOTO 100
160   PRINT:PRINT "Enter CLOCK Frequency in HERTZ:";
170   PRINT TAB(60);:INPUT CKA
180   IF CKA<1000 OR CKA>1E+06 THEN 160
190   IF FLA=1 THEN 230
200   PRINT:PRINT "What is MINIMUM (Full Load) PHASE LAG in Degrees ??";
210   PRINT TAB(60);:INPUT MNL
220   IF MNL<0 OR MNL>89 THEN 200
230   PRINT:PRINT "What is MAXIMUM (Min. Load) PHASE LAG in Degrees ??";
240   PRINT TAB(60);:INPUT MXL
250   IF MXL<MNL OR MXL>90 THAN 230
260   IF FLA=1 THEN 390
270   PRINT:PRINT "During the NEXT HALF-CYCLE you may specify:"
280   PRINT:PRINT " )1(. MINIMUM PHASE DELAY In Degrees; or,"
290   PRINT " )2( To CENTER THE PHASE CONTROL Range MID-CYCLE:":PRINT
300   PRINT TAB(20) "Enter Your Choice. . . )1( or )2(:";
310   PRINT TAB(60);:INPUT FLD
320   IF FLD=1 THEN 340
330   IF FLD=2 THEN 380 ELSE 300
340   PRINT:PRINT "What is the Desired NEXT CYCLE"
350   PRINT TAB(15) "MINIMUM PHASE DELAY In Degrees !!";
360   PRINT TAB(60);:INPUT DLC
370   GOTO 470
380   IF FLA=0 THEN 470
390   PRINT:PRINT "During the SAME HALF-CYCLE,"
400   PRINT " Enter Desired DEGREES of TIME-SKEW:";
```

| | -continued |
|---|---|
| 410 | PRINT TAB(60);:INPUT SKW |
| 420 | IF SKW<=0 THEN PRINT "Phase SKEW Must Be Greater than Zero":GOTO 400 |
| 430 | IF SKW+MSL>180 THEN PRINT "Desired Time Skew TOO BIG":GOTO 360 |
| 440 | SKA=180−MXL |
| 450 | IF SKW<SKA THEN 470 |
| 460 | PRINT "Phase SKEW Must be LESS Than"SKE "Degrees":GOTO 400 |
| 470 | IF FLA =0 THEN SKW=(180−MNL)+DLC |
| 480 | IF FLA=0 AND FLD=2 THEN SKW=(180−((MXL+MNL)/2))+90 |
| 490 | CKB=(1/(((1/LF)/360)*SKW)) |
| 500 | CKC=CKS:SKT=(1/CKB)*1000:CKD=CKA |
| 510 | IF CKC<2*CKB THEN PRINT "CLOCK Frequency TOO LOW":PRINT:GOTO 160 |
| 520 | IF CKD=<CKB THEN 550 |
| 530 | NSX=NSX+10:CKD=CKC/NSX |
| 540 | GOTO 520 |
| 550 | IF CKD=>CKB THEN 580 |
| 560 | CKD=CKC/NSX:NSX=NSX−1 |
| 570 | GOTO 550 |
| 580 | IF (CKB−CKC)>((CKC*2)−CKB) THEN NSX=NSX−1:CKC=CKC*2 |
| 590 | CSX=NSX |
| 600 | IF CSX=<1 THEN 630 |
| 610 | CSX=CSX/2:CNT=CNT+1 |
| 620 | GOTO 600 |
| 630 | IF CKD>CKB THEN PCT=((CKD−CKB)/CKB)*100 ELSE PCT=((CKB−CKD)/CKB)*100 |
| 640 | PCT=(INT(PCT*100))/100 |
| 650 | SKD=(1/CKD)*1000:SKE=(PCT/100)*SKW |
| 660 | GOSUB 1000:GOSUB 1010 |
| 670 | GOTO 680 |
| 680 | PRINT:GOSUB 1020;:PRINT "OPERATING VALUES FOR FIG. 11 CIRCUIT":PRINT |
| 690 | PRINT "The following VALUES and PARAMETERS have been"; |
| 700 | PRINT " determined for the COUNTER and" |
| 710 | PRINT "DECODER Circuit Elements of FIG. 11, as derived"; |
| 720 | PRINT " from the Motor Current Phase" |
| 730 | PRINT "Lag parameters and the desired operating conditions"; |
| 740 | PRINT " for the circuit." |
| 750 | PRINT:PRINT "Selected CLOCK FREQUENCY is:";:PRINT TAB(50) CKA " Hertz" |
| 760 | PRINT |
| 770 | IF FLA=0 THEN PRINT "Total Phase Skew (and into NEXT CYCLE) is:"; |
| 780 | IF FLA=1 THEN PRINT "SAME CYCLE Phase Skew is:"; |
| 790 | PRINT TAB(50) SKW " Degrees" |
| 800 | PRINT:PRINT "Selected Phase Skew TIME DELAY is"; |
| 810 | PRINT TAB(50) SKT " milliseconds" |
| 820 | PRINT:PRINT "ACTUAL Phase Skew TIME DELAY is:"; |
| 830 | PRINT TAB(50) SKD " milliseconds" |
| 840 | PRINT:PRINT "The Resulting PHASE SKEW ERROR is:"; |
| 850 | PRINT TAB(50) SKE " degrees" |
| 860 | PRINT:PRINT "DECODER 149 should be set to decode:"; |
| 870 | PRINT TAB(50) NSX " counts" |
| 880 | PRINT:PRINT "The Decoded COUNT ERROR is:"; |
| 890 | PRINT TAB(50) PCT " percent" |
| 900 | PRINT:PRINT "COUNTER 148 needs:";:PRINT TAB(50) CNT " stages" |
| 999 | END |
| 1000 | PRINT CHR$(27)"[2J";:RETURN 'CLEAR SCREEN (CLS) \| ANSI values are |
| 1010 | PRINT CHR$(27)"[H";:RETURN 'HOME CURSOR (HOME) \| for DEC VT-180 |
| 1020 | PRINT CHR$(27)"#6";:RETURN 'DOUBLE WIDTH CHARACTERS \| microcomputer. |

The control circuits of FIG. 9 and FIG. 11 are quick in operation. That is to say, they respond rapidly to any change in motor loading. It is usual that the current lag will instantly change whenever the motor 'dynamics', e.g. loading, change in any way. This change is acted upon immediately, either later in the same half-cycle as taught in FIG. 9, or else in the next half-cycle as might be provided by the teaching of FIG. 11. In either case, control is obtained within the time period of the same cycle: or for 60-hertz power, the response is typically on the order of 5 to 12 milliseconds.

Figure 12:
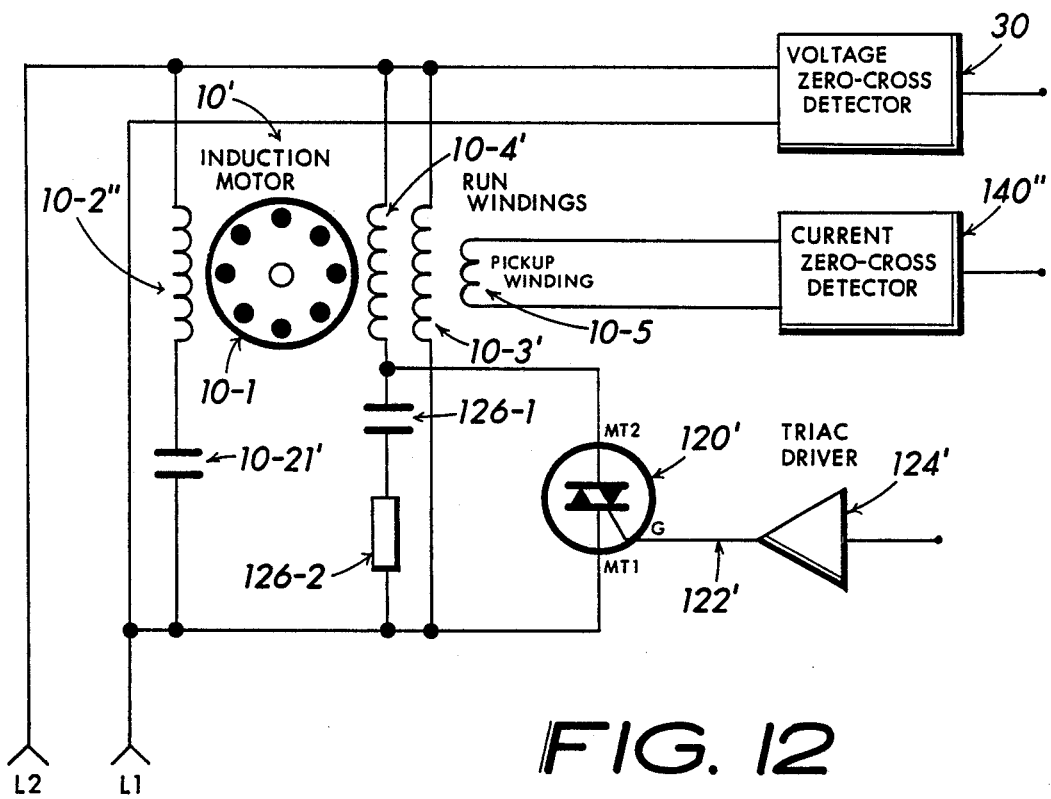
FIG. 12—Inductive pickup produces a sample of the RUN windinging lagging current phase.

A tertiary winding 10-5 may be interwound with the main RUN winding 103 as shown in FIG. 12, and the inductive coupling will produce an a.c. signal which may couple with the zero-cross detector 140''. The typical teritary winding may consist of a few winding turns which are wound together with the RUN windings 10-3' and 10-4'. The induced voltage will LAG the applied voltage, and the induced voltage LAG will be comparable with the motor current lag: hence, equatable with power factor. Combining the essence of the FIG. 12 circuit with the teachings of FIG. 11 provides for very economical control of common induction motors, such as the permanent split capacitor motor 10 which I show.

While I have endeavored to teach my invention in a particular form which can be convieniently described, such choice is merely for purpose of illustration and shall not construe any limitation on my invention when it is practiced in any other alternative form which may bring form substantially the same performance results.

Discrete circuit devices have been chosen to perform the necessitous operational tasks and such choice enables a concise description for the invention's novel performance. A skilled artisan might also choose to use a microprocessor or any combination of other known elements to practice the invention. It is thus to be clearly realized that it is the underlying essence of my invention: that of providing reduced power consumption and lessened harmonic distortions of the a.c. power line, which dominate these teachings. Such improved performance is mostly obtained through the use of more than one RUN winding, wherein the a.c. power fed to one RUN winding is usually controlled in proportion to motor loading as determined mainly by changes in current phase lag (i.e., power factor) while the other RUN winding is fully excited by a.c. power. A skilled artisan may reasonably be expected to find other combinations of circuit elements which will serve to modulate the motor's operation in a like way, and such engineering variations merely serve as expedients enabling the ready practice of my invention, wherein my invention's novelty resides in the appended claims.

What I claim as the essence of my instant invention is:

1. Power control method for use with an electric induction motor,
    comprising the steps of:
    providing a source of alternating current electric power;
    providing the motor with plural RUN winding means;
    coupling a first RUN winding means with the source;
    variably coupling a second RUN winding means with the source;
    sensing reactive power factor of the electric power drawn from the source by the RUN winding means;
    increasing the variable coupling when an increase in the power factor is sensed; and,
    decreasing the variable coupling when a decrease in the power factor is sensed.

2. Power control method of claim 1 comprising the further steps of:
    sensing instant voltage phase of the a.c. power coupled with the RUN winding means;
    sensing instant reactive current phase of the a.c. power current flow coupled with the RUN winding means; and,
    determining the reactive power factor by measuring the instant difference between the sensed voltage phase and the sensed current phase.

3. Power control method of claim 1 comprising the further steps of:
    predetermining a minimum value of FULL LOAD motor power factor;
    coupling substantially full a.c. power between the source and the second RUN winding means whenever the sensed power factor is higher than the predetermined minimum value power factor.

4. Power control method of claim 1 comprising the further steps of:
    predetermining a minimum value of FULL LOAD motor power factor;
    coupling substantially full a.c. power between the source and the second RUN winding means whenever the sensed power factor is higher than the predetermined minimum value power factor;
    predetermining a maximum value of MINIMUM LOAD motor power factor;
    coupling substantially no a.c. power between the source and the second RUN winding means whenever the sensed power factor is lower than the predetermined maximum value power factor; and,
    proportionally coupling a.c. power between the source and the second RUN winding means for power factor values between the maximum value of MINIMUM LOAD motor power factor (minimum coupling) and the minimum value of MAXIMUM LOAD motor power factor (maximum coupling).

5. Power control method of claim 4 comprising the further steps of:
    selecting an ampere/turns factor for the first RUN winding means suitable to produce sufficient motor field flux density to sustain operation with a minimum load coupled with the motor; and,
    selecting an ampere/turns factor for the second RUN winding means suitable to produce sufficient motor field flux density such that when coupled fully with the source of a.c. power and combined with the flux density produced by the first RUN winding means, the combined flux density is sufficient to sustain operation of the motor when fully loaded.

6. Power control method of claim 1 comprising the further step of:
    producing integral cycle control of any increase or decrease in variable coupling between the source and the second RUN winding means in which both half-cycles of any acted-upon full power cycle have about the same portion of ON time.

7. Power control method of claim 1 comprising the further steps of:
    inductively coupling an ancillary pickup winding means with the first RUN winding means;
    sensing the phase angle difference between the lagging voltage phase induced in the pickup winding means relative with the instant a.c. voltage phase coupled effectively across the first RUN winding means; and,
    determining at least a relative value of reactive power factor therefrom for producing control of the variable coupling between the source and the second RUN winding means.

8. Power control apparatus for use with an electric induction motor, comprising:
    source of alternating current electric power;
    induction motor means including at least a first RUN winding means and a second RUN winding means effective for producing motor field excitation;
    means for coupling an inconstant load means with said motor means;
    means for coupling the first RUN winding means with the electric power source;
    means for producing variable a.c. electric power coupling between the source and the second RUN winding means;
    means for sensing power factor; and,
    means coupled with said power factor sensing means and said variable a.c. electric power coupling means, effective to produce a controlled increase in the coupling of a.c. power between the source and the second RUN winding means whenever an increase in power factor is sensed; and to produce a controlled decrease in the coupling of a.c. power between the source and the second RUN winding means whenever a decrease in power factor is sensed.

9. Power control apparatus of claim 8 further including means for starting the motor comprising:
    START winding means;
    means for initially coupling the START winding means with the a.c. power source;
    means for decoupling the START winding means for the a.c. power source whenever the motor has attained substantial running speed; and,
    means for coupling essentially full a.c. electric power between the source and the second RUN winding means whenever the START winding means is coupled with the a.c. power source.

10. Power control apparatus of claim 8 further comprising:
   means for predetermining a non-linear relationship between the controlled increase and controlled decrease in the coupling of a.c. power with the second RUN winding relative with sensed changes in power factor; and,
   means for coupling said predetermining means operatively with said means which produces said controlled increase and decrease.

11. Power control apparatus of claim 8 wherein said variable power coupling means comprises a.c. power phase control thyristor means coupled effectively between the a.c. power source and the second RUN winding means.

12. Power control apparatus of claim 11 wherein said variable power coupling means comprises means for producing integral power cycle symmetry of phase controlled a.c. power flow therethrough in which both half-cycles of any acted-upon full power cycle have about the same portion of ON time.

13. Power control apparatus of claim 8 wherein said power factor sensing means comprises:
   means for sensing voltage zero-crossover of the a.c. power VOLTAGE PHASE cycle which essentially appears across the motor RUN winding means;
   means for sensing current zero-crossover of the a.c. power CURRENT PHASE cycle which essentially appears flowing through the RUN winding means;
   means coupled with said sensing means for determining an effective cycle-by-cycle phase delay signal indicative of the instant time difference between the sensed VOLTAGE PHASE cycle and the sensed lagging CURRENT PHASE cycle zero-crossover values; and,
   means for adapting the determined phase delay signal coupled therewith into a control signal coupblable with the variable a.c. power coupling means and effective to produce an increase of a.c. power coupling therethrough whenever the determined time difference decreases, whilst a.c. power coupling therethrough decreases whenever the determined time difference increases.

14. Power control apparatus of claim 13 further comprising:
   means for predetermining a minimum phase difference signal; and,
   means for coupling the minimum phase difference signal with the measured phase delay signal adapting means, whereby essentially full a.c. power is coupled through the variable a.c. power coupling means whenever the measured phase difference is of a duration effectively less than the value of the minimum phase difference signal.

15. Power control apparatus of claim 8 further comprising:
   means for combining the electromagnetic fields produced by the first RUN winding means and the second RUN winding means to provide motor field excitation.

16. Power control apparatus of claim 13 further comprising:
   means for sensing CURRENT flow through the motor RUN winding means that includes providing a secondary pickup winding means tightly coupled magnetically with the RUN winding means resulting in an induced a.c. potential across the pickup coil means having a lagging phase relative with the voltage phase coupled across the RUN winding means; and,
   means coupled with the pickup winding means effective for sensing zero-crossover of the induced a.c. potential.

17. Induction motor power control means comprising:
   alternating current power source;
   induction motor means including:
     means for producing a first electromagnetic field;
     means for producing a second electromagnetic field;
     means for combining said electromagnetic fields;
     means providing a rotatable output member;
     means coupling said combined fields with said member and effective to produce rotation of said member;
   means for coupling an inconstant load means with the output member;
   means for coupling said first electromagnetic field producing means with said power source;
   means for variably coupling said second electromagnetic field producing means with said power source;
   means for sensing phase lag of the a.c. power flow between the electromagnetic field producing means and the power source relative with instant voltage phase of the power source; and,
   means for determining a controlled increase in the efficacy of the variable coupling when the sensed phase lag decreases, and for determining a controlled decrease in the efficacy of the variable coupling when the sensed phase lag increases.

18. Power control means of claim 17 further comprising:
   means for coupling substantially full a.c. power between said source and said second electromagnetic field producing means preferably as electrical contact set means coupled in shunt with said variable coupling means whenever said rotating member is running at less than a predetermined speed; and,
   means for interrupting said full power coupling means whenever said rotating member is running higher than said predetermined speed.

19. Power control means of claim 17 wherein:
   said means for sensing phase lag of the a.c. power which flows substantially through the electromagnetic field producing means further comprises induction pickup means inductively coupled with said field producing means resulting in an induced a.c. potential across the pickup coil means having a lagging phase relative with the a.c. voltage coupled across the field producing means.

20. Power control means of claim 17 further comprising:
   said first electromagnetic field producing means comprising winding means predetermined to produce sufficient magnetic flux density to operate the motor means under minimum load; and,
   said second electromagnetic field producing means comprising winding means predetermined to produce sufficient magnetic flux density which, when combined with the magntic flux density produced by said first field producing means, is sufficient to operate the motor means under full load.

* * * * *